US012775584B1

(12) United States Patent
Sharma et al.

(10) Patent No.: US 12,775,584 B1
(45) **Date of Patent: *Oct. 27, 2026**

(54) SYSTEM AND METHODS FOR GENERATING SPARSE TREE FOR PRESENTING AND NAVIGATING THROUGH HIERARCHICAL FILES

(71) Applicant: Egnyte, Inc., Mountain View, CA (US)

(72) Inventors: Shishir Sharma, Mountain View, CA (US); Tomasz Kaczmarek, Poznan (PL); Lukasz Rek, Mountain View, CA (US); Krzysztof Zmudzinski, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,199

(22) Filed: Nov. 15, 2024

Related U.S. Application Data

(63) Continuation of application No. 17/551,862, filed on Dec. 15, 2021, now Pat. No. 12,147,388.

(51) Int. Cl.

| | |
|---|---|
| ***G06F 16/16*** | (2019.01) |
| ***G06F 16/13*** | (2019.01) |
| ***G06F 16/14*** | (2019.01) |

(52) U.S. Cl.
CPC ............ *G06F 16/168* (2019.01); *G06F 16/13* (2019.01); *G06F 16/156* (2019.01)

(58) Field of Classification Search
CPC ....... G06F 16/168; G06F 16/13; G06F 16/156
See application file for complete search history.

(56) References Cited

U.S. PATENT DOCUMENTS

| | | | | |
|---|---|---|---|---|
| 7,360,175 | B2 * | 4/2008 | Gardner | G06F 3/0482 715/825 |
| 9,383,905 | B1 * | 7/2016 | Kumar | G06F 3/048 |
| 2006/0036568 | A1 * | 2/2006 | Moore | G06F 16/168 |
| 2006/0242604 | A1 * | 10/2006 | Wong | G06F 16/168 715/854 |
| 2011/0235638 | A1 * | 9/2011 | Tempia Bonda | H04L 45/28 370/390 |
| 2013/0159104 | A1 * | 6/2013 | Ramaiyer | G06Q 30/00 705/14.54 |
| 2015/0378563 | A1 * | 12/2015 | Ramanathan | G06F 3/04842 715/781 |
| 2016/0371296 | A1 * | 12/2016 | Passey | G06F 16/185 |
| 2017/0147709 | A1 * | 5/2017 | Ganz | H04L 67/10 |
| 2017/0201451 | A1 * | 7/2017 | Allan | H04L 12/185 |

* cited by examiner

*Primary Examiner* — Angelica Ruiz

(57) ABSTRACT

Systems, apparatuses, and methods for generating a sparse tree view for presenting and assisting a user to conduct searches and navigate through a hierarchical file system more efficiently. A sparse tree assists a user to navigate through search or filtering results by hiding irrelevant information and indicating locations with the highest rate of "hits" using a form of heatmap or other indicator of the potential relevance of a tree node or leaf.

20 Claims, 7 Drawing Sheets

600

600

SYSTEM AND METHODS FOR GENERATING SPARSE TREE FOR PRESENTING AND NAVIGATING THROUGH HIERARCHICAL FILES

CROSS REFERENCE TO RELATED APPLICATIONS

This application claims the benefit of priority to and is a Continuation of U.S. patent application Ser. No. 17/551,862 filed on Dec. 15, 2021, and titled "SYSTEM AND METHODS FOR GENERATING SPARSE TREE FOR PRESENTING AND NAVIGATING THROUGH HIERARCHICAL FILES", the entire disclosure of which is hereby incorporated herein by reference.

BACKGROUND

Most electronic data is currently stored in hierarchical file systems wherein access to data starts at the top level and proceeds downward throughout the levels of the hierarchy. As the number of files and folders in a file system grows, its hierarchy, which is in a form of an n-ary tree, becomes deeper (i.e., has a greater number of levels) and levels tend to spread into a greater number of branches and leaves. This is a result of the increase in types and characteristics of data as more data is added to a system.

This increase in the complexity of a file system makes looking for specific information more difficult. Typically, a user interface that includes search and filtering operations based on attributes (such as field values) is used to make the search process easier for users and more computationally efficient. The search results or outcome may be presented as a flat list of items that are believed to match the search/filter criteria. However, as more data is added to a file system, the list typically becomes larger and more complex, resulting in greater difficulty for a user to identify the file or folder containing the data they desire, and to perform a desired action.

Conventional approaches to presenting search results in a user interface typically rely on a tree or flat list of items satisfying search or filtering criteria. However, this conventional approach, while satisfactory for some cases, becomes increasingly frustrating for users as the tree hierarchy and resulting flat list become larger and more complex.

What is desired are systems, apparatuses, and methods for more effectively generating a user interface to enable a user to conduct searches in a file system and to present the results in a more easily comprehended and utilized manner. Embodiments of the disclosure described herein address this and other objectives both individually and collectively.

SUMMARY

The terms "invention," "the invention," "this invention," "the present invention," "the present disclosure," or "the disclosure" as used herein are intended to refer broadly to all the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

The system, apparatuses, and methods disclosed herein are directed to graphical user interface technologies, web and cloud technologies, file system and data storage technologies, document storage and search technologies, and more particularly, to a system and method for implementing a sparse tree view for presenting and navigating through hierarchical file systems.

Embodiments of the disclosure are directed to addressing the previously mentioned issues regarding conventional approaches to displaying a file system and/or search results using a flat or dense tree structure by instead presenting results for searches and/or filtering operations in the form of a sparse tree. A sparse tree assists users to efficiently navigate through the search or filter results by hiding irrelevant information and indicating locations with the highest rate of "hits" using a form of heatmap or other indicator of the potential relevance of a tree node or leaf.

In some embodiments, hiding irrelevant information may take one or both of two forms: (1) discarding tree nodes that contain no information relevant for the query posed by the user to the system and (2) collapsing (compacting) tree nodes where the relevant information (i.e., the search or filtering result) is only present in a leaf or leaves of the descendant nodes. The described approach can be applied to any hierarchical dataset, including for example, a file system with metadata or an object store with nested namespaces arranged in a hierarchy.

In some embodiments, the disclosure is directed to a method for generating a user interface for presenting and permitting a user to navigate through a hierarchical file system. The file system is typically (although not exclusively) considered as a combination of folders and files, and the associated metadata for the folders and files. A user may submit a query and a system will return the folders, files, and the associated metadata to the user that satisfy the query. Typically, the system does this by attempting to match words or symbols in the query to the metadata associated with a folder or file.

In one embodiment, the method generates a visualization of a system's response to a user query in the form of a sparse tree. The sparse tree is generated from the query results and assists the user to navigate the results more efficiently. The method processes the query results in accordance with a specific set of operations to generate the sparse tree from information that would typically be used to generate a more detailed visualization. In one embodiment, the method may include the following steps, stages, functions, processes, or operations:

- Receive a file system query from a user;
  - The query is typically in the form of a set of search terms, metadata, field values, etc. that may be combined with Boolean operators to form the query;
  - Execute the query by a processing element in a device, system, server, etc.;
    - In a typical system, the query may be processed as part of an operating system or file management function;
  - Generate a result from executing the query, the result comprising an identification of one or more files or folders and/or metadata for the files or folders;
    - The identified files or folders are expected to contain data responsive to the query;

Process the result of executing the query to place the result into the form of a tree structure containing nodes, branches, and leaves indicating a path or paths through the file system hierarchy to the query result or results;

Reduce the complexity of the generated tree structure (or the data from which it could be constructed) indicating a path or paths through the file system hierarchy to the query result or results by executing the following rules or logic;

- Starting at the root node of the tree structure (or its representation in another form, such as an ordered set of data) and stepping through the tree in a descending manner to the branches and leaves;
  - Determine the path or paths between the root node and the node or nodes containing the results of the query;
- Remove nodes having no descendants of relevance (as represented by the results of the query);
- For each node having a child or children of relevance, collapse all nodes below the highest-level ancestor node and the child node;
  - This results in a visualization in which the entry point node to the query results is shown, and the child node containing the query results is shown, with no intervening nodes shown;
- Reconstruct the tree after the elimination of nodes and collapsing of nodes;
  - For each indirect path between a first and a second node, if more than a single path has a common ancestor, then collapse the paths below the last (the highest level) ancestor;

Process the result of applying the rules or logic to the tree structure to provide a set of data for generating a sparse tree structure;

Generate a display of the sparse tree structure, where the display comprises:

- One or more nodes;
- An indication that at least one of the nodes can be expanded;
  - An indication of the nodes that can be accessed by expanding the at least one node;
- A leaf accessible from at least one of the one or more nodes; and
- A file or folder accessible from the leaf;
- If multiple leaves contain a search result, then display an indication with each leaf of the relative number of files, folders, or documents containing a search result (optional);
  - Where the indication may be a metric, measure, a number, a category, a color indicating a relative number, etc.;

Receive a selection of a node from the user;

- In response, expand the selected node and display sub-nodes and/or leaves containing files, folders, or documents responsive to the search query or other form of filtering operation;

Receive a selection of a leaf from the user;

- In response, expand the leaf to indicate a list of the files, folders, or documents associated with the leaf;

Receive a selection of an item on the list of files, folders, or documents associated with the leaf; and

- In response, provide the user with access to the selected file, folder, or document.

In one embodiment, the disclosure is directed to a system for generating a user interface for presenting and permitting a user to navigate through a hierarchical file system. The system may include a set of computer-executable instructions and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to a set of computer-executable instructions, wherein when the set of instructions are executed by an electronic processor or co-processors, the processor or co-processors (or a device of which they are part) perform a set of operations that implement an embodiment of the disclosed method or methods.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the system, apparatuses, and methods in accordance with the present disclosure will be described with reference to the drawings, in which.

Note that the same numbers are used throughout the disclosure and figures to reference like components and features.

DETAILED DESCRIPTION

Figure 1:
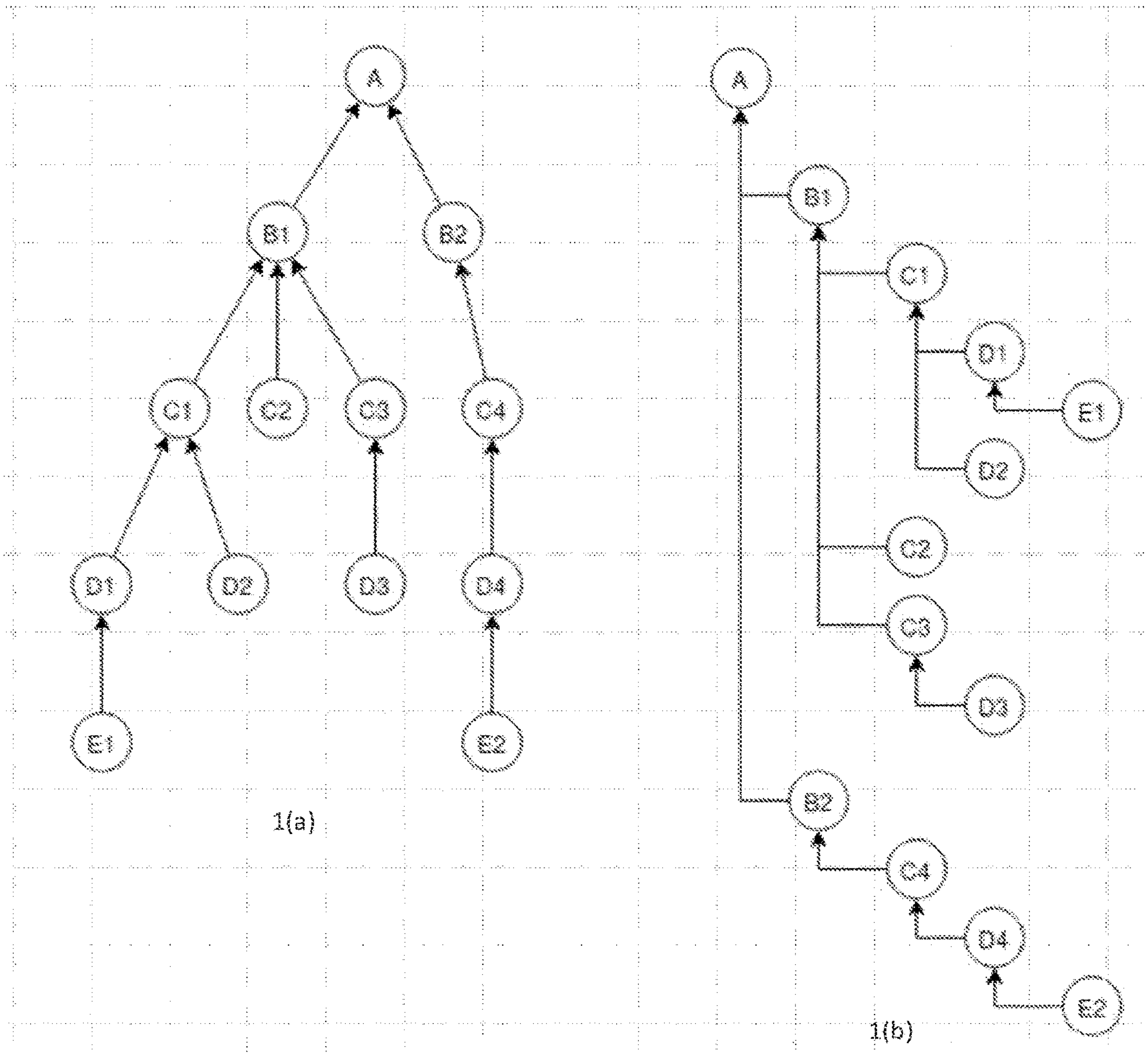
FIG. 1 is a diagram illustrating a conventional approach to presenting the results of a search query as a tree structure (FIG. 1(*a*)) and as a flat tree structure (FIG. 1(*b*))

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

The disclosed approach, methods, processes, and operations may be used with a file system containing folders and files, where the system also contains metadata information for the folder, the files, and in some cases for the contents of the files. In a typical use case, the metadata may be searched to identify a desired file, document, dataset, etc. The results of the search may be filtered, with the output of the search and/or filtering then presented to a user. When the file system is structured as a tree of nodes, branches, and leaves, the results may be presented as either a tree structure or a flat list of items that represent the results.

In some embodiments, the system includes an adapter for the file system metadata information originating in different file systems, where the adapter is configured to transform the metadata into a common (i.e., canonical) form. In one sense, the common form is a representation of a file system; folders and file information in general and including versions for versioned file systems. As a result of the transformation(s), searching and filtering based on the same criteria can be applied to multiple file systems at the same time. Further, the search results can be presented in one view next to each other.

In an example use case of an embodiment, a user interacts with the system through a graphical user interface, e.g., a web interface. The user builds a search and/or filter query in the user interface which is provided to a query engine that is responsible for translating the query to a form understandable by a processing component or service. When the query is executed by a processor (typically as a function that is part of an operating system or dedicated application), the processor traverses a precomputed tree (i.e., in the context of the disclosure a dense or non-sparse tree structure representing the hierarchy of files and folders and that is produced by the file system) and returns results in a form of a sparse tree to the user interface.

In some embodiments, the sparse tree is a screen or generated display that comprises one or more of:

- One or more nodes;
- An indication that at least one of the nodes can be expanded;
  - An indication of the nodes that can be accessed by expanding the at least one node;
- A leaf accessible from at least one of the one or more nodes; and
- A file or folder accessible from the leaf;
- If multiple leaves contain a search result, then display an indication with each leaf of the relative number of files, folders, or documents containing a search result (optional);
  - Where the indication may be a metric, measure, a number, a category, a color indicating a relative number, etc.

The following diagrams illustrate the processing of the result of a search query to generate a sparse tree by collapsing and pruning nodes from an original tree (or its associated data) generated in response to the query. The figures indicate the reduction in a user's cognitive burden and the amount of information they are required to understand to locate the file, folder, or document they desire. This is expected to improve the user's ability to navigate the file structure and access the files or folders that contain the information they seek. Note that the diagrams are general and represent an abstract tree structure containing almost any type of hierarchical information, with applications including file system navigation, geographical information presentation and navigation, and organizational structures, among others.

FIG. 1 is a diagram illustrating a conventional approach to presenting the results of a search query as a tree structure (FIG. 1(*a*)) and as a flat tree structure (FIG. 1(*b*)). FIG. 1(*a*) shows an example tree data structure (such as might result from executing a search query and presenting the results of the query) in its entirety, while FIG. 1(*b*) shows the tree structure of FIG. 1(*a*) unfolded in a way that is typically presented to a user by a graphical user interface. In a typical situation, some of the nodes in the tree may be of relevance to the user, but this is not apparent to the user, and an indication of relevance is usually not presented to the user. As a result, a user is forced to navigate through the nodes and investigate them one by one to find what they are seeking.

Figure 2:
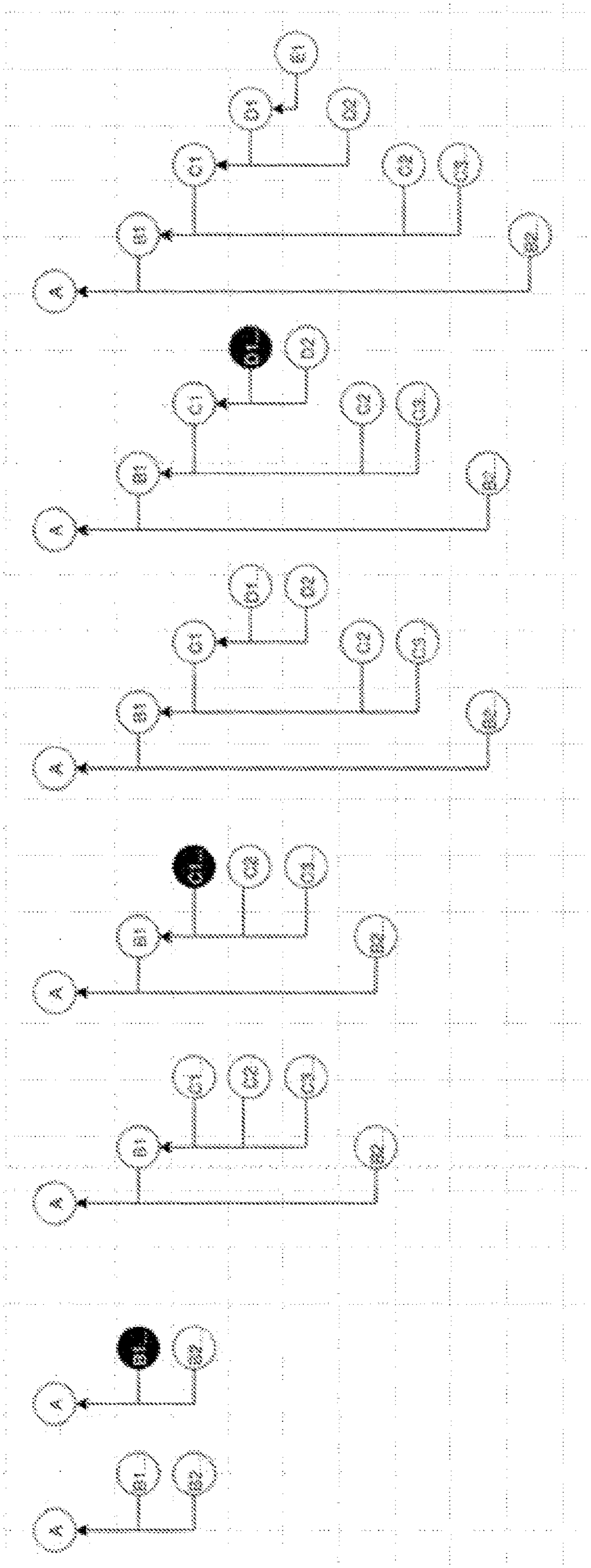
FIG. 2 is a diagram illustrating a conventional approach to navigating through the tree structures of FIG. 1.

FIG. 2 is a diagram illustrating a conventional approach to navigating through the tree structures of FIG. 1. As shown in the figure, the graphical user interface may indicate a possibility to unfold or expand a node, here represented as an ellipsis ( . . . ) on the node. The darkened nodes indicate a user action, e.g., a selection by a user to unfold or expand a particular node that seems relevant to the user as they navigate through the tree. As a node is selected, it is expanded into its underlying nodes as shown in the figure (from the perspective of a user moving from left to right in the figure and selecting or expanding each of the darkened nodes).

Figure 3:
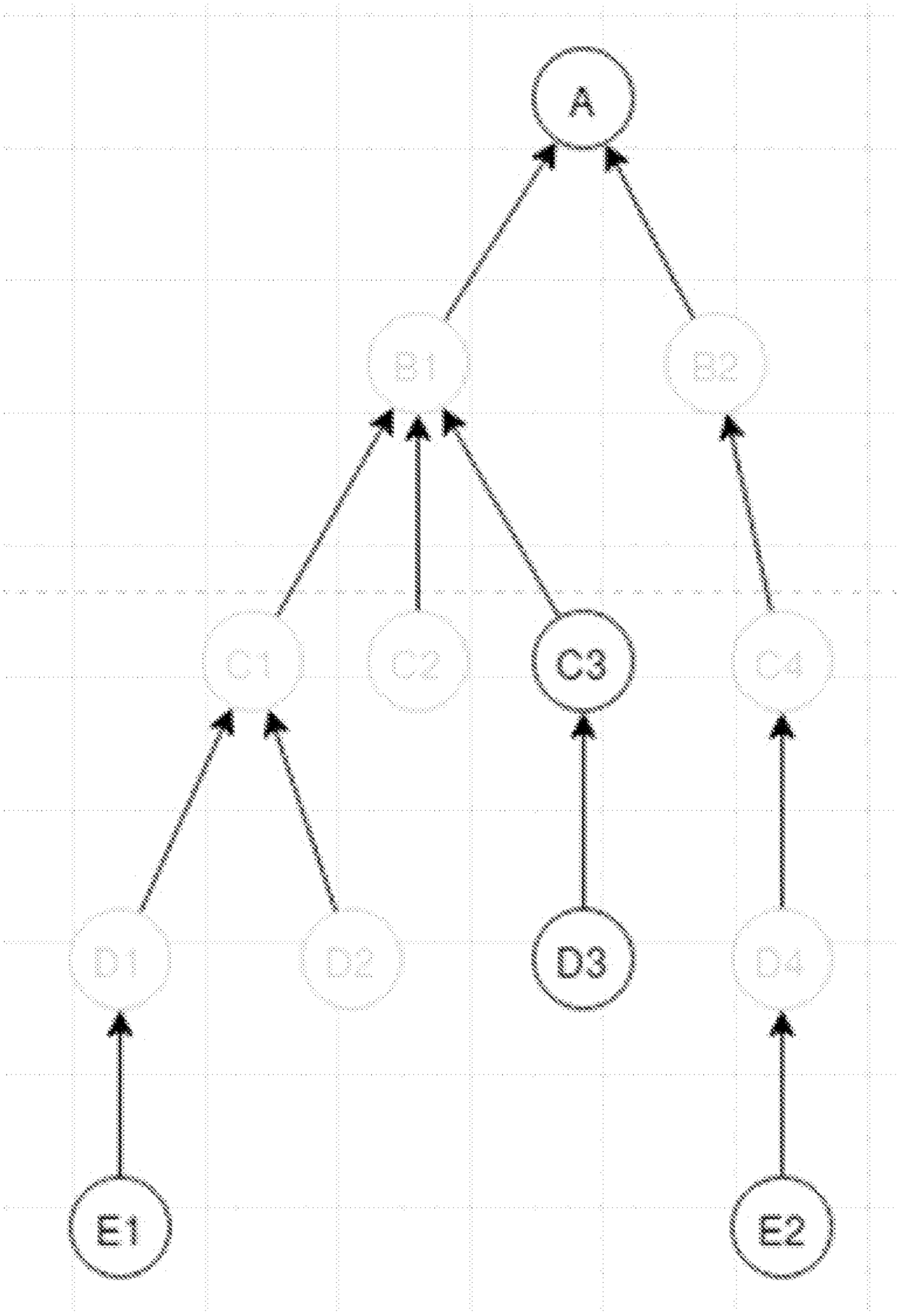
FIG. 3 is a diagram illustrating a representation of FIG. 1(*a*) for the example where only the relevant nodes are indicated by heavier marking, with the not relevant nodes being shown lighter, in accordance with some embodiments.

In one example, assume that the information relevant to the user query is found in nodes E1, C3, D3, and E2 (with node A being the entry point or root node). When the relevance (or lack) of some subset of the nodes is taken into account, the same tree could be abstractly depicted as shown in FIG. 3 (where the relevant nodes are indicated by heavier marking, with the not relevant nodes being shown lighter). As will be described, in one embodiment, the disclosure is directed to a process that may be used to reduce a tree of the form shown in FIG. 3 into a form of the type shown in FIG. 4 by collapsing nodes that do not have relevant child nodes and pruning those that have no relevant descendants and are not relevant themselves. When implemented, the described process generates a tree structure of the form shown in FIG. 4, which is simpler and easier for a user to understand and use to navigate to their desired search result.

Prior to describing the process, the following terms are introduced for purposes of clarity and consistency:

- Child node of X—a node in the tree that is directly under a node X;
- Parent node of X—a node in the tree that is directly above a node X;
- Descendant node of X—a node in the tree that is directly or indirectly under a node X. There is a (single) path leading from a descendant to X;
- Ancestor node of X—a node in the tree that is indirectly above node X. There is a single path leading from X to its ancestor;
- Leaf node—a tree node that has no child nodes;
- Reduction of tree—the proposed process of creating a sparse tree;
- Collapsing nodes—creating paths which merge several nodes on a common path into a single node;
- Pruning—removing irrelevant nodes from the tree;
- Folding/unfolding—a user action of collapsing/expanding child nodes.

As a non-limiting example of implementing the processing method disclosed, in some embodiments, the process for generating a sparse tree may comprise applying the following rules or heuristics:

- Reduce the complexity of a generated tree structure indicating a path or paths through a file system hierarchy to a query result or results by executing the following rules or logic;
  - Starting at the root node of the tree structure (or its representation in another form, such as an ordered set of data) and stepping through the tree in a descending manner to the branches and leaves;
    - Determine the path or paths between the root node and the node or nodes containing the results of the query;
  - Remove nodes having no descendants of relevance (as represented by the results of the query);
  - For each node having a child or children of relevance, collapse all nodes below the highest node and the child node;
    - This results in a visualization in which the entry point node to the query results is shown, and the child node containing the query results is shown, with no intervening nodes shown;
  - Reconstruct the tree after the elimination of nodes and collapsing of nodes;
    - For each indirect path between a first and a second node, if more than a single path has a common ancestor, then collapse the paths below the last (the highest level) ancestor;
- Process the result of applying the rules or logic to the tree structure to generate a sparse tree structure;
- Generate a display of the sparse tree structure, where the display comprises:
  - One or more nodes;
  - An indication that at least one of the nodes can be expanded;
    - An indication of the nodes that can be accessed by expanding the at least one node;
  - A leaf accessible from at least one of the one or more nodes; and
  - A file or folder accessible from the leaf;
  - If multiple leaves contain a search result, then display an indication with each leaf of the relative number of files, folders, or documents containing a search result (optional);
    - Where the indication may be a metric, measure, a number, a category, a color indicating a relative number, etc.

In one embodiment, to reduce the number of nodes, a process termed sparsification is used, which operates to prune the nodes according to one or more rules. In the tree shown in FIG. 3, node D2 is collapsed into a single node with C1 and labelled with a path C1/D1 in the sparse tree of FIG. 4. Node C2 in FIG. 3 is collapsed to node B1. Further, nodes B2, C4, and D4 of FIG. 3 are collapsed into a single node and labelled with a path B2/C4/D4 in the sparse tree of FIG. 4. The rules or heuristics used to control the generation of the sparse tree are specified in such a way that the original node with the relevant information responding to the user query will not be part of a label assigned to collapsed nodes. This ensures that there is no overload of information because relevant nodes are visible only after unfolding the collapsed one.

The described rules or heuristics can be applied from the root of the tree in a descending manner through the tree, as the user is selecting and unfolding nodes. In some ways this is similar to a breadth-first search algorithm. The rules or heuristics calculate the visible child nodes of an unfolding node and are applied to every node starting from the root node of a tree.

As described, the rules or heuristics apply a set of processing steps to obtain the list of collapsed nodes:

- The tree resulting from the search query is expanded to a full list of paths and then reduced so that only relevant paths remain;
  - This operates to reduce the information burden when navigating the tree by removing irrelevant nodes;
- The process reconstructs the reduced tree to perform the collapsing of one or more nodes;
  - This determines where to further reduce the tree to the level where it branches into multiple children'
  - The reduced tree can be expanded—the result is a list of direct children and their descendants under the unfolded node;
  - The children and their descendants can be collapsed in a straightforward manner by joining them using the "/" separator.

As an example of the implementation of the described processing to generate a sparse tree, below is a set of pseudocode for converting or transforming a hierarchical tree structure into a spare tree to provide a user with easier and more efficient navigation to the result of their search query:

```
Input: tree_node that is unfolding, tree
Output: a list of nodes
function SPARSIFY(tree_node, tree)
  exploded_paths=EXPLODE(GET_SUBTREE(tree,
    tree_node))
  # the first rule is applied in the following step
  relevant_paths=CUT_IRRELEVANT(exploded_paths)
  reduced_tree=TO_TREE(relevant_paths)
  # the second rule is applied in the following step
  single_child_tree=TRIM_TO_SINGLE_CHILD(re-
    duced_tree)
  single_child_paths=EXPLODE(single_shild_tree)
  return COLLAPSE(single_child_paths)
```

The functions that are applied on the subsequent steps are outlined below in pseudo code (except from the GET_SUBTREE function which is returning part of the original tree originating at the given node). The base algorithm(s) for a function are indicated where relevant. Here the term function is used in its standard (albeit slightly informal) meaning in the computing environment—that is, a unit of computation that is specified in steps, operates on a provided input of a certain type, using whatever computing resources and operations are available, and produces a result of a certain type.

The function(s) TO_TREE and EXPLODE operate to convert between a tree and a list of paths that constitute the tree. The EXPLODE function is based on a breadth-first search algorithm used for searching in trees and graphs. It uses a stack data structure (also known as a last-in-first-out queue). The TO_TREE algorithm trims the tree, so that only the common prefix of multiple paths remains stored in the tree.

```
Input: a tree
Output: a list of paths
function EXPLODE(tree)
  current_path = empty list of nodes
  result = empty list of paths
  stack = empty stack
  push the root of the tree to stack
  while stack is not empty
    node = pop a node from the top of the stack
    current_path = determine the path to the node
    if node has children then
      push children to stack
    else
      append current_path to result
  return result
Input: list of paths
Output: tree
function TO_TREE(paths)
  tree = empty tree
  for every path in paths sorted
  by length in descending order
    current_subtree = tree
    for every node in path
      if node is a child in current_subtree then
        current_subtree = descend
        in current_subtree to node
      else
      current_subtree = descend in
      current_subtree to node
      Current subtree = empty tree
    clear current_subtree
  return tree
```

The function CUT_IRRELEVANT applies the TRIM process to every path, additionally discarding empty paths. The trimming is important to ensure that only the relevant parts of the original tree are retained.

```
Input: path
Output: path
function TRIM(path)
  first = determine the index of the first
  relevant node in the path
  if first is empty then
    return empty path
  else
    if first is at the beginning of the path then
      return path consisting of the first node only
    else
      return path until the first (excluded)
```

The function TRIM_TO_SINGLE_CHILD applies a tree trimming recursive algorithm. It is based on the approach used to traverse trees or graphs known as a depth-first search.

```
Input: tree
Output: tree
function TRIM_TO_SINGLE_CHILD(tree)
  result = empty tree
  for every node in children of the tree:
    if node has less than one or just one child then
        insert node into the result with children given by:
        recursive application of
        TRIM_TO_SINGLE_CHILD(child)
    else
      insert node into the result without children
  return result
```

Figure 4:
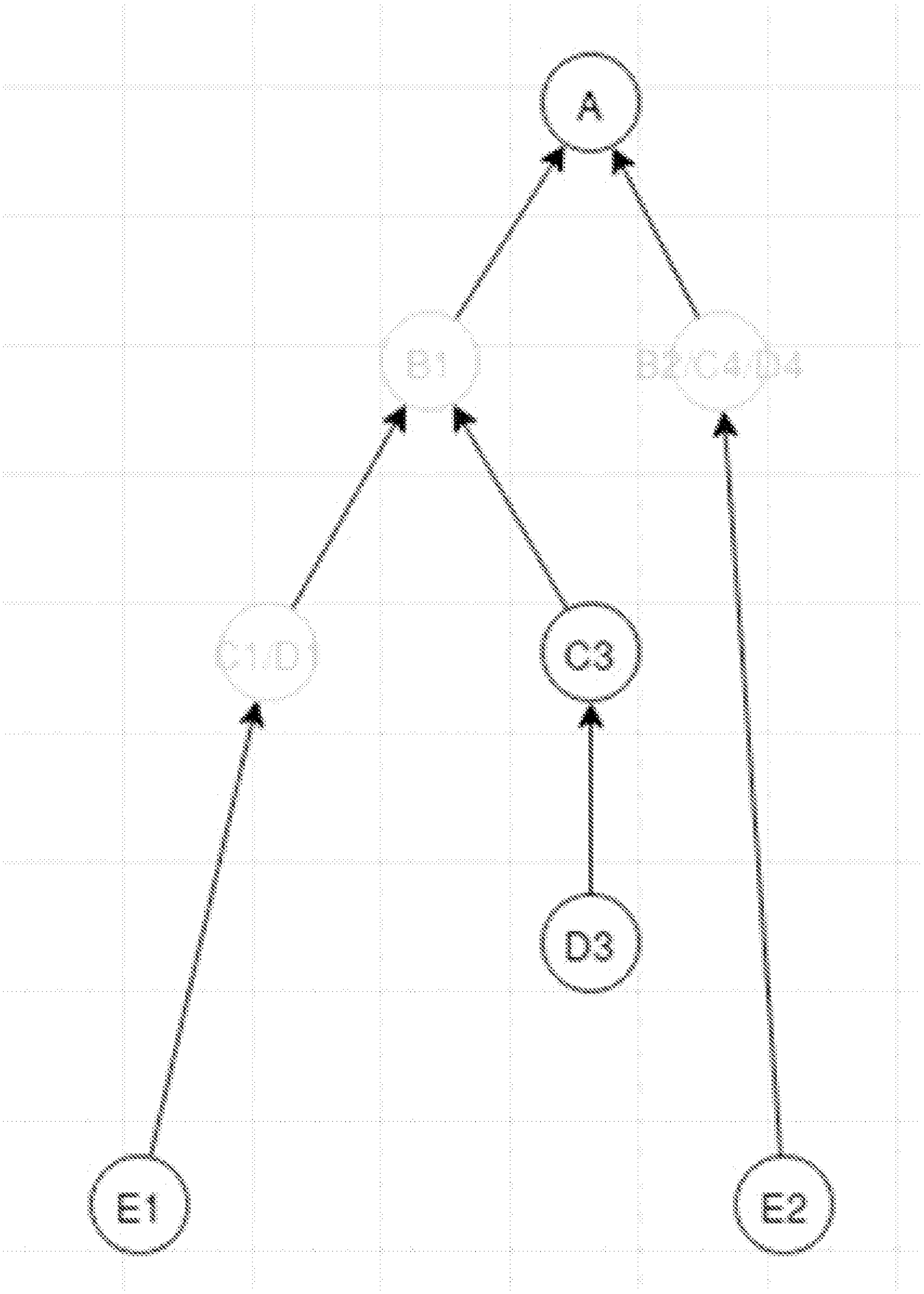
FIG. 4 is a diagram illustrating a representation of FIG. 3 after application of the processing method described herein, in accordance with some embodiments.
Figure 5:
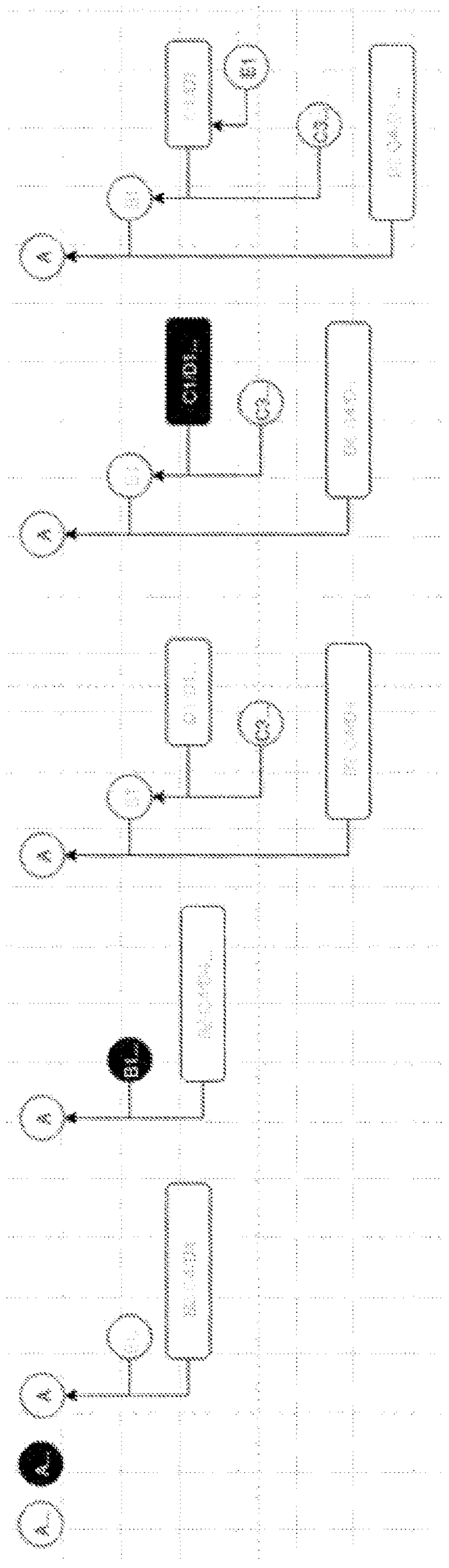
FIG. 5 is a diagram illustrating how a user can navigate through the tree structure of FIG. 4, in accordance with some embodiments.

FIG. 5 is a diagram illustrating how a user can navigate through the tree structure of FIG. 4, in accordance with some embodiments. As shown in the figure, the original tree structure (as shown in FIG. 1(*a*)) has been simplified, with the darkened nodes in FIG. 5 indicating the nodes selected by a user for expansion. The final structure after unfolding to node E1 is significantly smaller than that shown in FIG. 1(*a*), while no information is lost. Additionally, each unfolding will lead to a relevant node; in this sense the collapsing and pruning rules are tuned so that no user actions (clicks) are lost to unfolding nodes that are not relevant.

Note that the combination of the applied rules ensures that a user is not overloaded with information when there are many child nodes to be presented, as there is a parent node present in the structure which can be folded, thus hiding potentially large numbers of children. Further, the collapsing process ensures that the user avoids unnecessary navigation steps which would bring them to the relevant descendant anyway. Together the rules ensure that the tree structure is maintained so the user is presented with the same relevant information as would be presented in the original tree.

Although the system and processes disclosed herein have been described with reference to searching a hierarchical file structure and presenting a query result in the form of a sparse-tree representation of file system metadata, the approach can also be applied to other domains. These domains include but are not limited to geographical information presentation and navigation, presentation of organizational structures, and presentation of catalogs. Each of these other domains or use cases is described in greater detail below.

Geographical Information Presentation

Geographical information is inherently hierarchical—continents can be subdivided into countries or regions, which can be subdivided further into states, counties, or other progressively smaller territorial units, each of which may contain various terrain features: lakes, rivers, roads, buildings etc. The amount of information is quite large and in this context the approach described is helpful by collapsing the terrain units (for example continent/country/state/county) and pruning irrelevant nodes according to the user query.

Organizational Structures Presentation

Organizational structures of various types are often based on (or include) a hierarchy. Even some of the more advanced structures, such as matrix-based organizations, may include multiple hierarchies as part of the structure. Typically, people are assigned to various levels of the hierarchy and when the structure is queried based on the attributes describing the people involved (e.g., organizational tenure, skills, or competences, etc.), the approach described herein can be applied to present both accurate and more easily understood answers. For example, in this use case various levels of organizational structure would be collapsed into single paths, while only relevant employees would be presented as leaves in the resulting sparse tree.

Catalog Presentation

Products or services are oftentimes categorized into multiple level hierarchies to present them in a convenient and organized manner to potential customers, both in print and online. The online version is usually accompanied by a query capability. In this use case, the approach described herein may be used to present the results of a query, where the products matching a user query are the leaves of a tree of the product categories. In this example, collapsing of the categories into paths would provide a compact representation of the information, while pruning irrelevant pieces of the category tree avoids presenting unnecessary information. This reduces the likelihood of user information overload, and such a form of presenting information may be preferable to the usual form of a list of products, as it retains the original catalog structure. This improves the usefulness of the online format and gives the user more context and control over the query.

Figure 6:
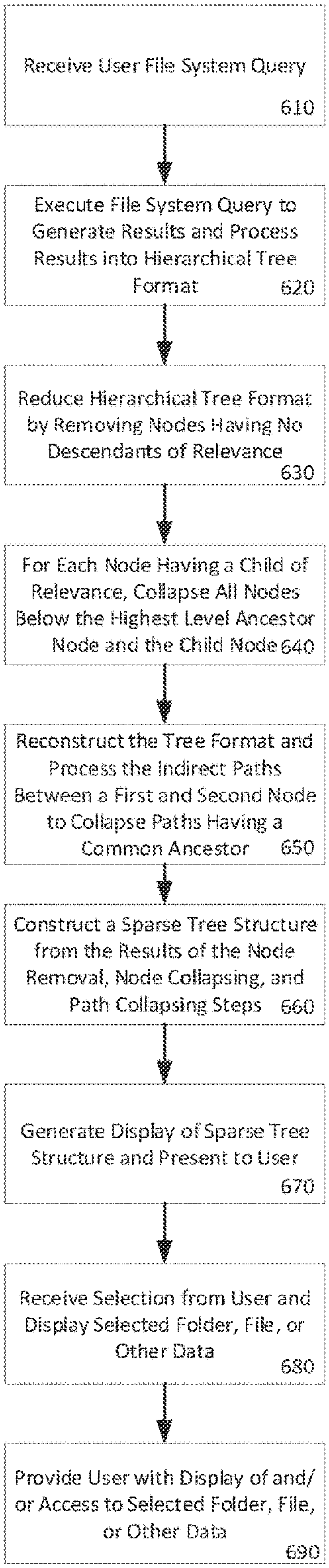
FIG. 6 is a flowchart or flow diagram illustrating a method, process, operation of function for generating a user interface for presenting and permitting a user to navigate through a hierarchical file system, in accordance with some embodiments.

FIG. 6 is a flowchart or flow diagram illustrating a method, process, operation of function for generating a user interface for presenting and permitting a user to navigate through a hierarchical file system, in accordance with some embodiments. As shown in the figure, the method may include the following steps, stages, functions, processes, or operations:

- Receiving a user query directed to finding a folder, file, or other data stored in a hierarchical file system (as suggested by step or stage 610);
  - In some embodiments, the query may comprise keywords and Boolean or other logical connectors;
  - The search may be performed over metadata for the folders, files, or other data stored in the file system;
- Executing the received query to generate a set of query results and processing the set of results (if needed) into a hierarchical tree format of nodes, branches, and leaves (as suggested by step or stage 620);
  - In some cases, the search query may be executed by an operating system or dedicated application;
- Apply the logic and processing described to reduce the hierarchical tree format of the query results by removing nodes having no descendants of relevance (as suggested by step or stage 630);
  - Where a child node or leaf refers to a sub-node or leaf that contains the result of the query and represents a folder, file, or data that the search process has identified as satisfying the user query;
- For Each Node Having a Child of Relevance, Collapse All Nodes Below the Highest-Level Ancestor Node and the Child Node (as suggested by step or stage 640);
  - This may be accompanied by inserting an indication of which node or nodes may be seen when a specific node is expanded;
- Reconstruct the Tree Format and Process the Indirect Paths Between a First and Second Node to Collapse Paths Having a Common Ancestor (as suggested by step or stage 650);
- Construct a Sparse Tree Structure from the Results of the Node Removal, Node Collapsing, and Path Collapsing Steps (as suggested by step or stage 660);
- Generate a Display of the Sparse Tree Structure and Present to User (as suggested by step or stage 670), where the display comprises one or more of the following features, items, or elements:
  - One or more nodes;
  - An indication that at least one of the nodes can be expanded;
    - An indication of the nodes that can be accessed by expanding the at least one node;
  - A leaf accessible from at least one of the one or more nodes; and
  - A file or folder accessible from the leaf;
    - If multiple leaves contain a search result, then display an indication with each leaf of the relative number of files, folders, or documents containing a search result (optional);
      - Where the indication may be a metric, measure, a number, a category, a color indicating a relative number, etc.;
- Receive Selection from User and Display Selected Folder, File, or Other Data (as suggested by step or stage 680); and
- Provide User with Display of and/or Access to the Selected Folder, File, or Other Data (as suggested by step or stage 690).

Figure 7:
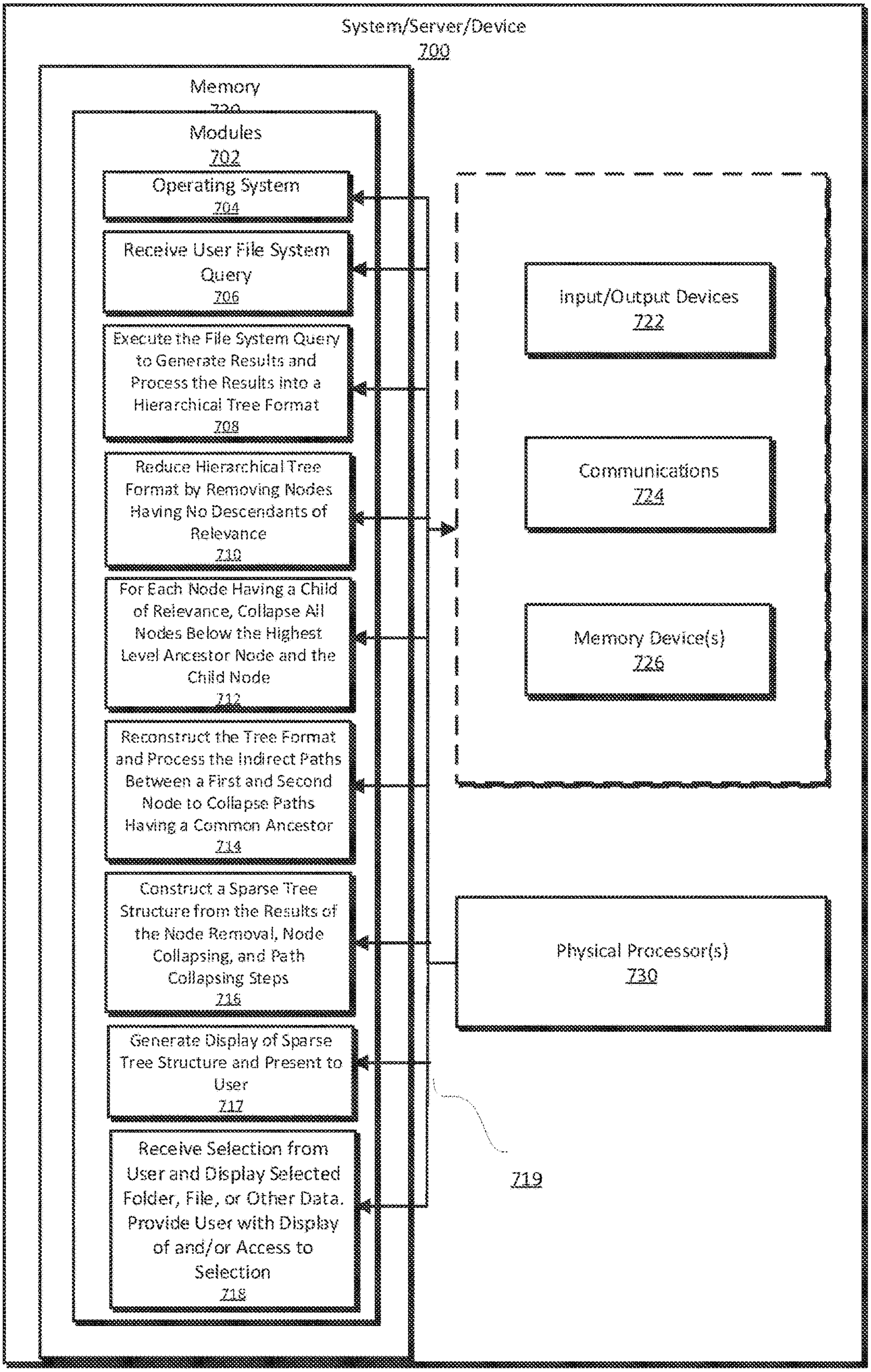
FIG. 7 is a diagram illustrating elements or components that may be present in a computer device or system configured to implement a method, process, function, or operation in accordance with some embodiments.

FIG. 7 is a diagram illustrating elements or components that may be present in a computer device or system configured to implement a method, process, function, or operation in accordance with an embodiment of the system and methods described herein. As noted, in some embodiments, the system and methods may be implemented in the form of an apparatus that includes a processing element and a set of executable instructions. The executable instructions may be part of a software application and arranged into a software architecture.

In general, an embodiment may be implemented using a set of software instructions that are designed to be executed by a suitably programmed processing element (such as a GPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by execution of the instructions contained in the module or sub-module. Such function, method, process, or operation may include those used to implement one or more aspects, techniques, components, capabilities, steps, or stages of the described system and methods. In some embodiments, a subset of the computer-executable instructions contained in one module may be implemented by a processor in a first apparatus and a second and different subset of the instructions may be implemented by a processor in a second and different apparatus. This may happen, for example, where a process or function is implemented by steps that occur in both a client device and a remote server.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

The modules may contain one or more sets of instructions for performing a method or function described with reference to the Figures and to the descriptions of the functions and data processing operations provided in the specification. These modules may include those illustrated but may also include a greater number or fewer number than those illustrated. As mentioned, each module may contain a set of computer-executable instructions. The set of instructions may be executed by a programmed processor contained in a server, client device, network element, system, platform, or other component.

A module may contain computer-executable instructions that are executed by a processor contained in more than one of a server, client device, network element, system, platform, or other component. In some embodiments, a plurality of electronic processors, with each being part of a separate device, server, platform, or system may be responsible for executing all or a portion of the instructions contained in a specific module. Thus, although FIG. 7 illustrates a set of modules which taken together perform multiple functions or operations, these functions or operations may be performed by different devices or system elements, with certain of the modules (or instructions contained in those modules) being associated with those devices or system elements.

As shown in FIG. 7, system 700 may represent a server or other form of computing or data processing system, platform, or device. Modules 702 each contain a set of executable instructions, where when the set of instructions is executed by a suitable electronic processor or processors (such as that indicated in the figure by "Physical Processor(s) 730"), system (or server, platform, or device) 700 operates to perform a specific process, operation, function, or method. Modules 702 are stored in a memory 720, which typically includes an Operating System module 704 that contains instructions used (among other functions) to access and control the execution of the instructions contained in other modules.

The modules 702 stored in memory 720 are accessed for purposes of transferring data and executing instructions by use of a "bus" or communications line 719, which also serves to permit processor(s) 730 to communicate with the modules for purposes of accessing and executing a set of instructions. Bus or communications line 719 also permits processor(s) 730 to interact with other elements of system 700, such as input or output devices 722, communications elements 724 for exchanging data and information with devices external to system 700, and additional memory devices 726.

Modules 702 may contain computer-executable instructions which when executed by a programmed electronic processor (or processors) cause the processor(s) or a device or system containing the processor(s) to perform one or more of the following functions, processes, methods, or operations:

- Receive a User File System Query (corresponding to module 706);
- Execute the File System Query to Generate Results and Process the Results into a Hierarchical Tree Format (corresponding to module 708);
- Reduce Hierarchical Tree Format by Removing Nodes Having No Descendants of Relevance (module 710);
- For Each Node Having a Child of Relevance, Collapse All Nodes Below the Highest-Level Ancestor Node and the Child Node (module 712);
- Reconstruct the Tree Format and Process the Indirect Paths Between a First and Second Node to Collapse Paths Having a Common Ancestor (module 714);
- Construct a Sparse Tree Structure from the Results of the Node Removal, Node Collapsing, and Path Collapsing Steps (module 716);
- Generate a Display of the Sparse Tree Structure and Present to User (module 717); and
- Receive Selection from User and Display Selected Folder, File, or Other Data (module 718);
  - In some embodiments, this may include instructions, that when executed cause a device or system to Provide the User with a Display of and/or Access to the Selected Folder, File, or Other Data.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as Python, Java, JavaScript, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU, or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that may direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein may be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this disclosure. Accordingly, the present invention is not limited to the embodiments described above or depicted in the drawings, and various embodiments and modifications may be made without departing from the scope of the claims below.

That which is claimed is:

1. A method for generating a user interface display, comprising:

accessing a response generated to a user's file system query, the response in a hierarchical form comprising a set of nodes and a set of connections between one or more of the nodes;

removing nodes from the hierarchical form having no descendants of relevance to the response to the query;

for each node having a child node of relevance, collapsing all nodes below the highest-level ancestor node and the child node;

reconstructing the hierarchical form;

collapsing paths between a first and a second node having a common ancestor in the reconstructed hierarchical form;

constructing a sparse hierarchical form from the results of the node removal, node collapsing, and path collapsing steps; and generating a display of the sparse hierarchical form.

2. The method of claim 1, further comprising:

receiving a selection of an item in the sparse form from the user; and in response to the selection, displaying a folder or file selected by the user.

3. The method of claim 2, further comprising providing the user with access to the selected folder or file.

4. The method of claim 1, wherein the generated display further comprises:

one or more nodes;

an indication that at least one of the nodes can be expanded;

a leaf accessible from at least one of the one or more nodes; and a file or folder accessible from the leaf.

5. The method of claim 4, wherein the indication further comprises an indication of the nodes that can be accessed by expanding the at least one node.

6. The method of claim 4, further comprising an indication with each leaf of the relative number of files, folders, or documents containing a query result when multiple leaves contain a query result.

7. The method of claim 6, wherein the indication with each leaf of the relative number of files, folders, or documents containing a query result comprises one of a metric, a measure, a number, a category, and a color indicating a relative number.

8. A system for generating a user interface display, comprising:

one or more electronic processors configured to execute a set of computer-executable instructions; and the set of computer-executable instructions, wherein when executed, the instructions cause the one or more electronic processors to access a response generated to a user's file system query, the response in a hierarchical form comprising a set of nodes and a set of connections between one or more of the nodes;

remove nodes from the hierarchical form having no descendants of relevance to the response to the query;

for each node having a child node of relevance, collapse all nodes below the highest-level ancestor node and the child node;

reconstruct the hierarchical form;

collapse paths between a first and a second node having a common ancestor in the reconstructed hierarchical form;

construct a sparse hierarchical form from the results of the node removal, node collapsing, and path collapsing steps; and generate a display of the sparse hierarchical form.

9. The system of claim 8, wherein the set of computer-executable instructions further cause the one or more electronic processors to:

receive a selection of an item in the sparse form from the user; and in response to the selection, display a folder or file selected by the user.

10. The system of claim 8, wherein the generated display further comprises:

one or more nodes;

an indication that at least one of the nodes can be expanded;

a leaf accessible from at least one of the one or more nodes; and a file or folder accessible from the leaf.

11. The system of claim 10, wherein the indication further comprises an indication of the nodes that can be accessed by expanding the at least one node.

12. The system of claim 10, wherein the generated display further comprises an indication with each leaf of the relative number of files, folders, or documents containing a query result when multiple leaves contain a query result.

13. The system of claim 12, wherein the indication with each leaf of the relative number of files, folders, or documents containing a query result comprises one of a metric, a measure, a number, a category, and a color indicating a relative number.

14. A set of computer-executable instructions that when executed by one or more programmed electronic processors, cause the processors to generate a user interface display by:

accessing a response generated to a user's file system query, the response in a hierarchical form comprising a set of nodes and a set of connections between one or more of the nodes;

removing nodes from the hierarchical form having no descendants of relevance to the response to the query;

for each node having a child node of relevance, collapsing all nodes below the highest-level ancestor node and the child node;

reconstructing the hierarchical form;

collapsing paths between a first and a second node having a common ancestor in the reconstructed hierarchical form;

constructing a sparse hierarchical form from the results of the node removal, node collapsing, and path collapsing steps; and generating a display of the sparse hierarchical form.

15. The set of computer-executable instructions of claim 14, wherein the instructions further cause the processors to:

receive a selection of an item in the sparse form from the user; and in response to the selection, display a folder or file selected by the user.

16. The set of computer-executable instructions of claim 14, wherein the generated display further comprises:

one or more nodes;

an indication that at least one of the nodes can be expanded;

a leaf accessible from at least one of the one or more nodes; and a file or folder accessible from the leaf.

17. The set of computer-executable instructions of claim 16, wherein the indication further comprises an indication of the nodes that can be accessed by expanding the at least one node.

18. The set of computer-executable instructions of claim 16, wherein the generated display further comprises an indication with each leaf of the relative number of files, folders, or documents containing a query result when multiple leaves contain a query result.

19. The set of computer-executable instructions of claim 18, wherein the indication with each leaf of the relative number of files, folders, or documents containing a query result comprises one of a metric, a measure, a number, a category, and a color indicating a relative number.

20. The set of computer-executable instructions of claim 14, wherein the instructions further cause the processors to provide the user with access to the selected folder or file.

* * * * *